2 Sheets—Sheet 1.

J. A. CLEARWATERS.
Check Row Corn Planter.

No. 230,469. Patented July 27, 1880.

Fig. 1.

WITNESSES:
Henry N. Miller
C. Sedgwick

INVENTOR:
J. A. Clearwaters
BY Munn & Co
ATTORNEYS.

2 Sheets—Sheet 2.

J. A. CLEARWATERS.
Check Row Corn Planter.

No. 230,469. Patented July 27, 1880.

WITNESSES:
Henry N. Miller
C. Sedgwick

INVENTOR:
J. A. Clearwaters
BY Munn & Co
ATTORNEYS.

UNITED STATES PATENT OFFICE.

JAMES A. CLEARWATERS, OF GOODLAND, INDIANA, ASSIGNOR OF ONE-HALF OF HIS RIGHT TO ELIAS MILLER, OF SAME PLACE.

CHECK-ROW CORN-PLANTER.

SPECIFICATION forming part of Letters Patent No. 230,469, dated July 27, 1880.

Application filed October 24, 1879.

*To all whom it may concern:*

Be it known that I, JAMES A. CLEARWATERS, of Goodland, in the county of Newton and State of Indiana, have invented a new Improvement in Check-Row Corn-Planters, of which the following is a specification.

Figure 2:
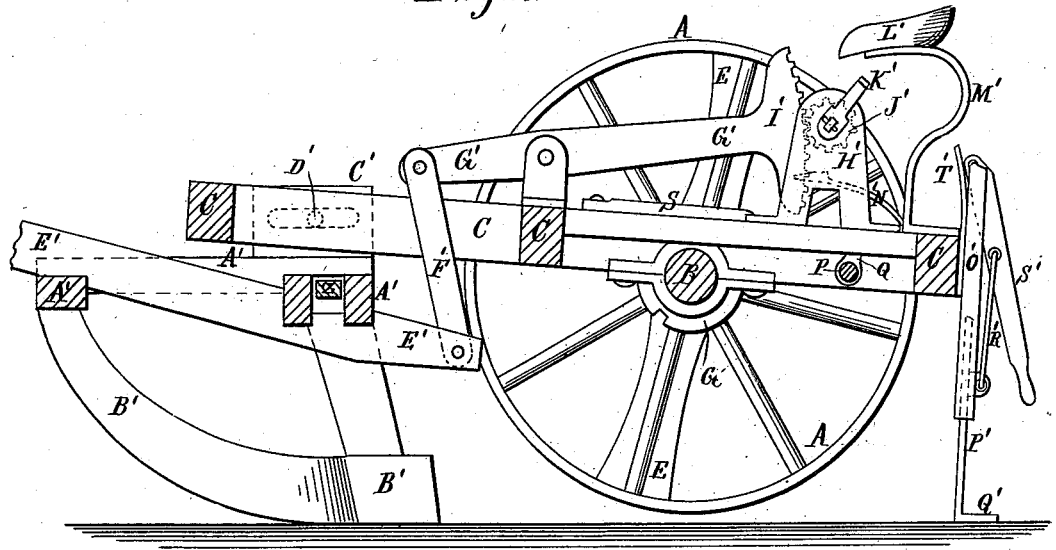
Figure 3:
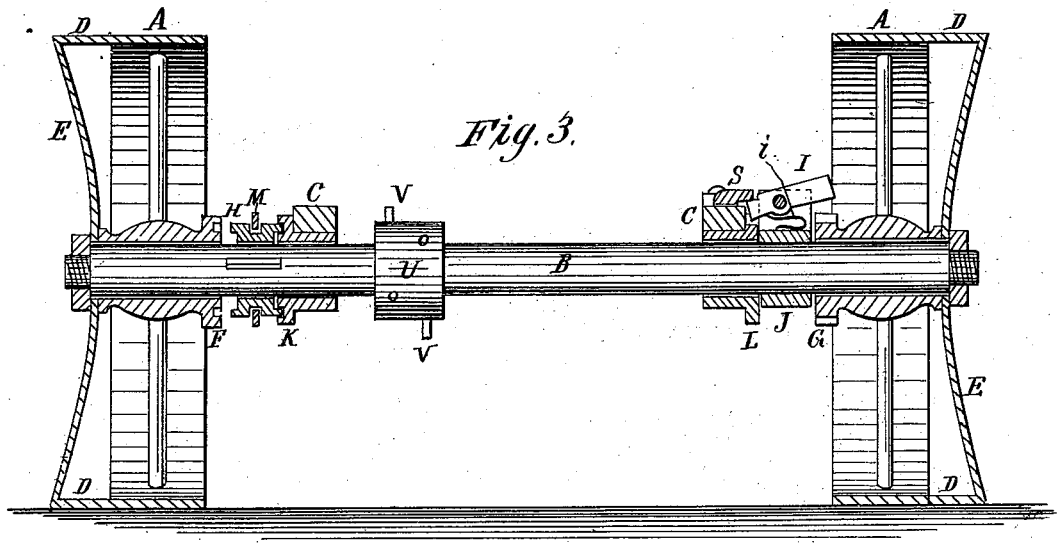

Figure 1, Sheet 1, is a plan view of the improvement. Fig. 2, Sheet 2, is a sectional side elevation taken through the line $x\ x$, Fig. 1. Fig. 3, Sheet 2, is a sectional rear elevation taken through the line $y\ y$, Fig. 1.

Similar letters of reference indicate corresponding parts.

The object of this invention is to furnish improved corn-planters so constructed that the seed will be planted automatically as the machines are drawn forward, while the mechanism shall be at all times fully under the control of the driver.

A are the wheels, the axle B of which revolves in bearings attached to the carriage-frame C. The wheels A are made of such a size that their circumference will be equal to twice the required distance between the hills.

To the outer sides of the rims of each wheel A are attached two projections, D, to mark the ground opposite the hills. The projections D are strengthened by cross-bars E, the ends of which are connected with the outer ends of the projections D. The cross-bars E have holes through their centers to receive the ends of the axle B, and are secured in place upon the said axle ends by the axle-nuts.

To the inner ends of the hubs of the wheels A are attached two clutch-wheels, F G. The clutch-wheel F has recesses in its inner sides to receive the teeth of the clutch-sleeve H, which is connected with the axle B by a tongue and groove, so that it may slide upon the axle B, but must revolve with the axle. The clutch-wheel G has notches in its rim to receive the end of the small lever-pawl I, which is pivoted to and between lugs formed upon the clutch-collar J. Beneath the lever I is placed a small spring, $i$, so arranged as to press the outer end of the lever I downward to enter the notches of the clutch-wheel G.

To the outer sides of the side bars of the frame C, or to the axle-bearings, are attached wheels or disks K L. The disk K has recesses in its outer side to receive projections or teeth upon the inner end of the clutch H, and upon the upper side of the rim of the disk L is formed a notch to receive the inner end of the lever I, so that the clutches, when adjusted to release the wheels A, will hold the axle B stationary.

The clutch-collar J fits the space between the clutch-wheel G and the disk L, so that the axle B can have no longitudinal movement when the clutch-sleeve H is withdrawn from the clutch-wheel F.

Around the clutch-sleeve H is formed a groove to receive the forked forward end of the elastic lever M, the rear end of which is attached to a side bar of the frame C. To the elastic lever M, near its forked forward end, is attached the outer end of a bar, N, which slides longitudinally in a bearing in the side bar of the frame C.

In the inner end of the sliding bar N is formed a slot to receive the tapered lower end of the lever O, which tapered end is curved upon the arc of a circle, so that it may pass back and forth through the slot in the bar N as the said lever is turned upon its fulcrum.

The lever O is rigidly attached to the rod P, which rocks in bearings in the side bars of the frame C, and thus serves as a fulcrum for the said lever O. The upper end of the lever O projects into such a position that it may be readily reached and operated by the driver from his seat. To the rod P, near its other end, is rigidly attached an arm, Q, to the upper end of which is pivoted the rear end of a short connecting bar or link, R. The forward end of the bar or link R is pivoted to the rear end of the short arm of the lever S, the forward end of the long arm of which is pivoted to the upper side of the side bar of the frame C.

The lever S is widened at its angle, and in the said widened part is formed a transverse slot to receive a guide-pin, T, attached to the side bar of the frame C, to hold the lever S down upon the said side bar, while allowing it to have the necessary play upon its pivot.

With this construction, when the lever O is operated to withdraw the clutch H from the clutch-wheel F, the lever S is moved outward, so that it may serve as a stop for the inner end of the small lever-pawl I to strike against to raise the outer end of the said lever-pawl I out of the notch in the clutch-wheel G, so that both the wheels A will be released from the axle B at the same time. When the lever O is operated to throw the clutch H into gear with the clutch-wheel F the lever S is moved inward to release the small lever-pawl I and allow its outer end to be pressed downward to engage with the clutch-wheel G.

The clutches are so arranged that the wheels A will always be locked when the marker cross-bars E are in a vertical position.

To the axle B is keyed or otherwise attached a cylinder, U, in which, near each end, are formed two rows of holes to receive pins V. The pins V alternate with each other.

When two pins, V, are used two hills will be dropped at each revolution of the wheels A, and by using a greater number of pins, V, the corn will be planted in drills.

W is a lever, the rear end of which is widened, is curved to fit the face of the cylinder U, and is made with a central point and with inclined shoulders at the sides of the said point, so that the lever may be vibrated by the contact of its inclined shoulders with the pins V. The lever W is pivoted to a cross-bar of the frame C, or to a support, X, attached to the said frame. The forward part of the lever W is slotted longitudinally to receive a pin, Y, attached to the seed-dropping bar Z, which slides upon the sled-frame A', so as to take the seed from the hoppers and drop it to the ground. The seed-hoppers are not shown in the drawings. The seed is dropped through the forked rear ends of the runners B' into the channel opened by the said runners.

The runners B' are attached to the frame A'. To the rear part of the sled-frame A are attached the lower wings of angular plates C', the upper wings of which are slotted longitudinally to receive pins or bolts D', attached to the side bars of the carriage-frame C. This construction allows the machine to be readily adjusted when starting in at the beginning of the rows and when the cross-rows get out of line, so that the hills will be in exact check-row. To accomplish this the team is stopped with the seed-dropping device as nearly as convenient in line with the cross-rows, and the driver then rolls the carriage forward until the axle is in line with the previous check-marks. The wheels are then adjusted, the team is started, and the sled will be drawn forward the space of the adjustment before any motion is given to the carriage. The carriage will then be drawn forward, planting the hills in accurate check-row. In the same way the machine can be adjusted in any part of the rows should the cross-rows get out of line.

To the middle part of the sled-frame A' is attached the tongue E', to which the draft is applied. To the rearwardly-projecting end of the tongue E', or to some other support attached to the sled-frame A', is pivoted the lower end of the connecting-bar F', the upper end of which is pivoted to the forward end of the lever G'. The lever G' is pivoted to a support attached to the middle part of the carriage-frame C. The rear end of the lever G' moves up and down between two guide-standards, H', attached to the rear part of the carriage-frame C. Upon the rear end of the lever G' is formed a vertical cross-head, I', the rear edge of which is curved upon the arc of a circle, and has teeth formed in it, to mesh into the teeth of a small gear-wheel, J', pivoted to and between the upper parts of the standards H'. To the journals of the gear-wheel J' are attached cranks K', which project in opposite directions, as shown in Fig. 1, so that the driver can work the cranks K' with his feet to operate the lever G' and raise and lower the sled-frame A', as required.

L' is the driver's seat, which is attached to the upper end of the spring-standard M'. The lower end of the seat-standard M' is attached to the rear part of the frame C in such a position that the driver can reach and operate the cranks K' with his feet while sitting upon the seat L'. To the rear part of the frame C is attached a spring-catch, N', to engage with one of the cranks K', and thus lock the frame A' in any position into which it may have been adjusted. The catch N' can be pressed down from the crank K' to lower the sled by the driver with his foot when desired. To the center of the rear side of the rear cross-bar of the frame C is attached a vertical bar, O', which has a dovetailed longitudinal groove formed in its rear side to receive a sliding bar, P'. Upon the lower end of the sliding bar P' is formed a foot, Q', of sufficient size to prevent the said bar P' from being pushed into the ground by the weight of the machine. To the middle part of the sliding bar P' is pivoted the lower end of the connecting-bar R', the upper end of which is pivoted to the lever S'. The forward end of the lever S' is pivoted to the upper end of the grooved bar O', so that by operating the lever S' the bar P' will be forced downward to rest upon the ground and raise the carriage to allow the wheels A to be adjusted as may be required. The lever S' is locked in either position by a spring, T', attached to the forward side of the bar O', and which rests against the beveled end of the lever S'.

This arrangement is especially advantageous in starting in at the side of the field for adjusting the seed-dropping mechanism, so that the hills may be in line with the hill previously planted, and may thus be in accurate check-row.

With this construction the driver, by operating the lever O, can throw the machine into and out of gear as required. By operating the lever S' he can raise the carriage and adjust the machine to plant the hills in line with the hills previously planted, and by operating the cranks K' he can raise the sled from the ground or force it deeper into hard soil when desired, so that the machine is fully under the driver's control.

With this construction, also, the machine when at work will plant the hills at uniform distances apart, and the marks made by the markers D enable the driver to plant the rows exactly parallel.

To the rear corners of the frame C are attached bars U', which project across the faces of the wheels A, to scrape off any soil that may adhere to them, so that they may measure off uniform spaces by their revolution.

Having thus described my invention, what I claim as new, and desire to secure by Letters Patent, is—

1. The combination of the elastic clutch-lever M, the slotted slide-bar N, the lever O, having arc-shaped end and rigidly attached to the rocking rod P; the arm Q, link R, lever S, transversely slotted, and the guide-pin T, whereby both clutches may be simultaneously operated, as set forth.

2. In a seed-planter, the combination, with the carriage-frame C, of the grooved bar O', the sliding bar P', the connecting-bar R', the lever S', and the spring T', substantially as herein shown and described, so that the carriage may be raised from the ground and the dropping mechanism conveniently adjusted, as set forth.

JAMES ARMSTRONG CLEARWATERS.

Witnesses:
W. H. TOWNSEND,
ELIAS MILLER.